United States Patent
Hasvold et al.

[11] Patent Number: 5,256,501
[45] Date of Patent: Oct. 26, 1993

[54] SEA WATER BATTERY

[75] Inventors: Oistein Hasvold, Oslo; Tor Garshol, Frei, both of Norway

[73] Assignee: Forsvarets forskningsinstitutt, Kjeller, Norway

[21] Appl. No.: 866,978

[22] Filed: Apr. 10, 1992

[30] Foreign Application Priority Data

Aug. 21, 1989 [NO] Norway .................................. 893338

[51] Int. Cl.$^5$ .......................... H01M 6/10; H01M 6/34
[52] U.S. Cl. ........................................ 429/94; 429/119
[58] Field of Search .................. 429/105, 119, 242, 94

[56] References Cited

U.S. PATENT DOCUMENTS

| | | | |
|---|---|---|---|
| 3,079,456 | 2/1963 | Pawlak | 429/119 X |
| 3,491,063 | 9/1968 | Opitz | 429/119 |
| 3,508,971 | 4/1990 | Colbeck et al. | 429/119 X |
| 4,822,698 | 4/1989 | Jackovitz et al. | 429/119 X |

FOREIGN PATENT DOCUMENTS

87/07085 11/1987 PCT Int'l Appl. .
89/11165 11/1989 PCT Int'l Appl. .

Primary Examiner—Stephen Kalafut
Attorney, Agent, or Firm—Robbins, Berliner & Carson

[57] ABSTRACT

This invention relates to sea water cells or salt water galvanic cells or batteries which use oxygen dissolved in the sea water as the oxidant, and in particular to cathodes which are suitable for cells which are exposed to high hydrodynamic forces (from waves or strong currents). The cathode (3, 12) may consist of a helix, or spirally wound perforated or expanded metal plate or sheet. The cathode (20) may alternatively consist of a number of concentrical spaced apart layers of cylinders of a perforated or expanded metal sheet. The number of layers of the cathode is 2-50. preferably 3-20. The layers of the cathode are spaced apart with radially arranged bars, spacers, notches (4, 15, 16) or the like.

16 Claims, 3 Drawing Sheets

SEA WATER BATTERY

This application is a continuation of PCT application Ser. No. 01/000056, filed Mar. 23, 1990.

FIELD OF THE INVENTION

The present invention relates to sea water batteries or saltwater galvanic cells or batteries which use oxygen dissolved in the seawater as the oxidant, and it relates in particular to cathodes which are suitable for cells which are exposed to high hydrodynamic forces (from waves or strong currents).

Low power seawater cells which use the oxygen dissolved in the seawater as the oxidant and a consumable anode for example as described in International Publication No. WO 89/11165 (Hasvold 3) have been successfully tested in the sea over nearly two years. These cells use an inert metal cathode (stainless steel) which is coated with a catalyst for the reduction of oxygen. In batteries, the cells are connected in parallel, and the cell voltage is converted to a useful value with a DC/DC converter.

Seawater batteries are attractive as they can be stored in a dry condition indefinitely, they have an energy density which compares favorably with lithium batteries and they pose no safety hazards, as they are neither flammable nor do they contain any toxic compounds.

The chemical reactions in a typical seawater battery with magnesium anode are:

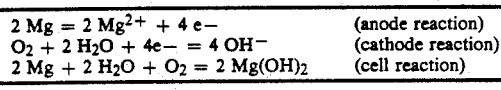

| | |
|---|---|
| $2\,Mg = 2\,Mg^{2+} + 4\,e-$ | (anode reaction) |
| $O_2 + 2\,H_2O + 4e- = 4\,OH^-$ | (cathode reaction) |
| $2\,Mg + 2\,H_2O + O_2 = 2\,Mg(OH)_2$ | (cell reaction) |

Magnesium is a major component in the seawater which makes the magnesium based seawater battery environmentally harmless. A discharged battery can easily be recharged mechanically by inserting a new magnesium anode.

To ensure a high surface area of the cathode, the inert metal can be in the form of wool sandwiched between two layers of metal net or expanded metal. The packing of the wool is loose to provide an easy flow of fresh, oxygenrich seawater through the cathode structure. Additionally, the cell must have an open structure to allow free access of fresh seawater and to get rid of the reaction products formed.

If such a cell is used close to the water surface under conditions of strong wave action, the wool structure may be mechanically destroyed unless a very stiff quality is used. Also, close to the surface, biofouling (for example of algae, barnacles and mussels) will be a problem unless copper or a copper alloy is used as the cathode. The corrosion of copper will normally leak sufficient amounts of copper ions to function as an excellent antifouling agent as long as the cathode potential is not lowered too much from the free corrosion potential of the metal. As the corrosion potential of copper is low compared to the cathode potential of catalyzed cathodes under load, the cell voltage of copper based seawater cells is however only 1.2 V as compared to 1.6 V for cells using catalyzed stainless steel. Also, as copper is a very soft metal, copper-wool cathodes do not have sufficient strength to be used under rough conditions. Metal plate cathodes can be used, but the mass transport limiting current for plates is low and decreases with the length of the plate. This has been described in a book by Klaus J. Vetter: 'Electrochemical Kinetics' published by Academic Press, New York 1967. Thus unless the plates are perforated, plate cathodes have low efficiency and are expensive to produce. If the cathode consists of wire which is thin compared to the thickness of the diffusion layer, cylindrical diffusion will further increase the mass transport limiting current and thus the loadability of the cathode.

DESCRIPTION OF THE RELATED ART

From U.S. Pat. No. 4,522,897 (M. A. Walsh) there is known a so called rope battery having a flexible structure. The rope battery consists of a central flexible anode, a porous separator and a flexible outer coaxial cathode. The cathode consists preferably of twisted or braided strands of an inert metal, but can also be made of perforated metal sheet or expanded sheet metal. This kind of battery will probably not be suitable for cells which are exposed to high hydrodynamic forces (from waves or strong currents).

OBJECT OF THE INVENTION

The object of the present invention is to provide seawater cells and batteries which are mechanically robust, inexpensive to produce and have a high efficiency. The features of the invention are defined in the claims.

Above mentioned and other features and objects of the present invention will clearly appear from the following detailed description of embodiments of the invention taken in conjunction with the drawings, where

DETAILED DESCRIPTION OF THE INVENTION

Figure 1:
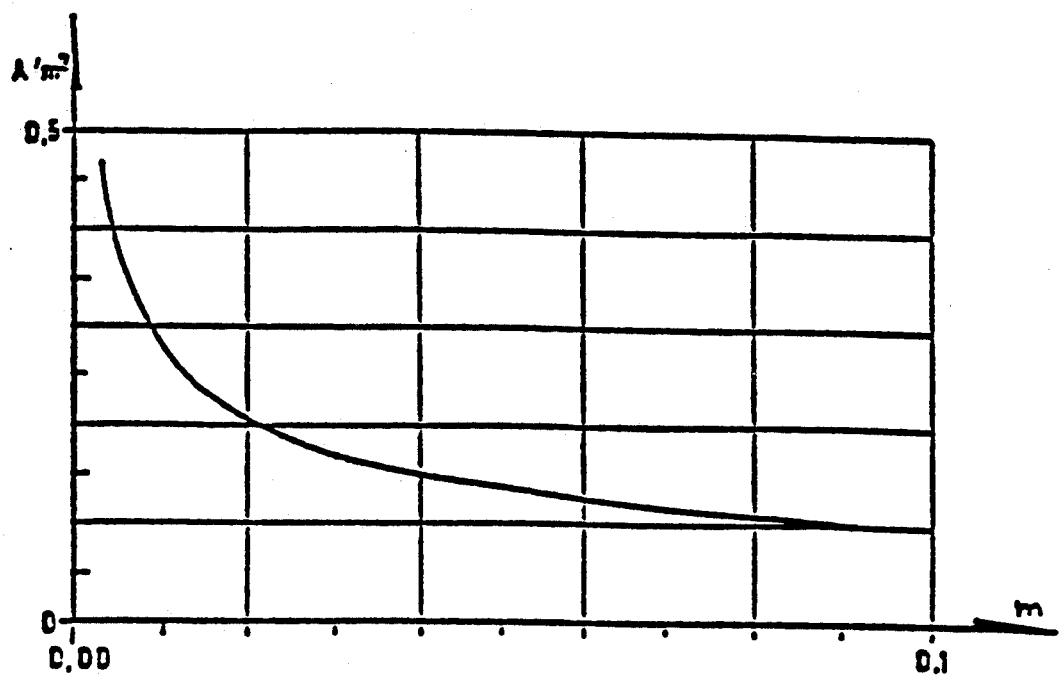
FIG. 1 shows a curve illustrating how plate sizes influence the limiting current.

In FIG. 1, the curve, which is calculated from the equations 2.153 and 2.91 in the above-mentioned book by K. J. Vetter, shows that the mean limiting current density decreases rapidly with increasing plate size. The curve values are calculated at a flow velocity of 0.001 m/s parallel to the surface and in the length direction of the plate. As the limiting current is the highest current density possible, the size of the plate perpendicular to the direction of flow should be kept as small as is consistent with the mechanical loads on the cathode.

The curve describes the mean current density over a plate cathode as a function of the length of the plate, assuming pure diffusion control of the reaction. (Ideal electrocatalyst and infinite conductivity of the electrolyte.) Current generated at the leading edge is not included.

Another aspect of achieving a high limiting current is to reduce the compositional changes of the electrolyte at the electrode surface. These changes (alkalinization) increases when the ratio between the actual current density and the limiting current density increases and may eventually lead to formation of a calcareous layer on the cathode.

Figure 2:
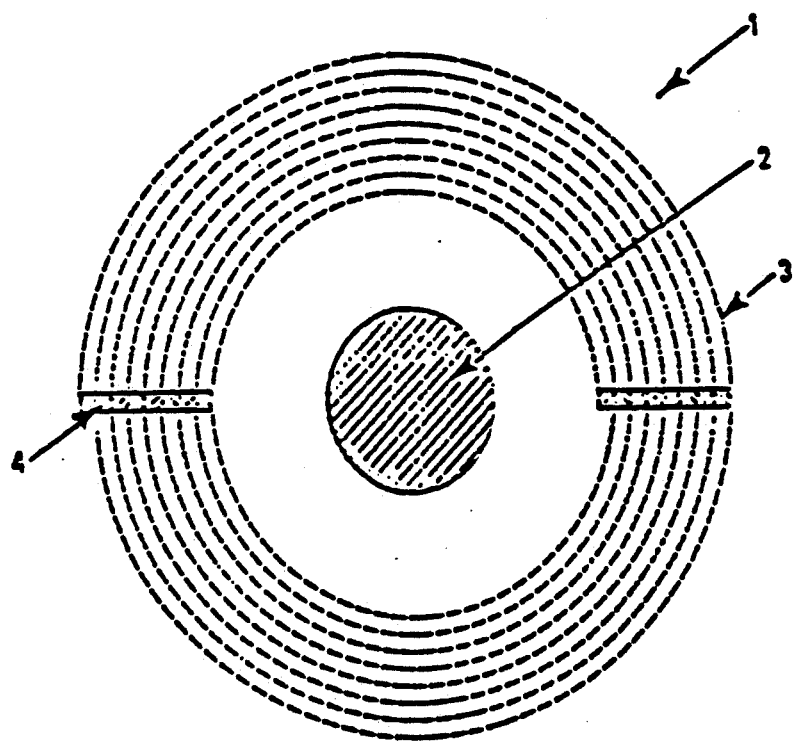
FIG. 2 shows a spiral cathode.

Good results have been obtained with a cell 1 which is schematically illustrated in FIG. 2. An anode 2 is encircled by a cathode 3 made from an expanded metal sheet which is coiled in a spiral. The number of spiral layers, turns should be 2-50 and preferably between 3 and 20 to obtain good results. Mechanical strength is gained either from radially welded metal bars 4 or from spacers between the layers or both. Notches in the expanded metal along the edge may also serve as spacers. They may be welded to the adjacant layer. The preferred way of making the cathode is to place the end of the precoiled helix in a mould and fill the mould with a polymer. After curing, the process is repeated with the other end of the spiral.

Figure 3:
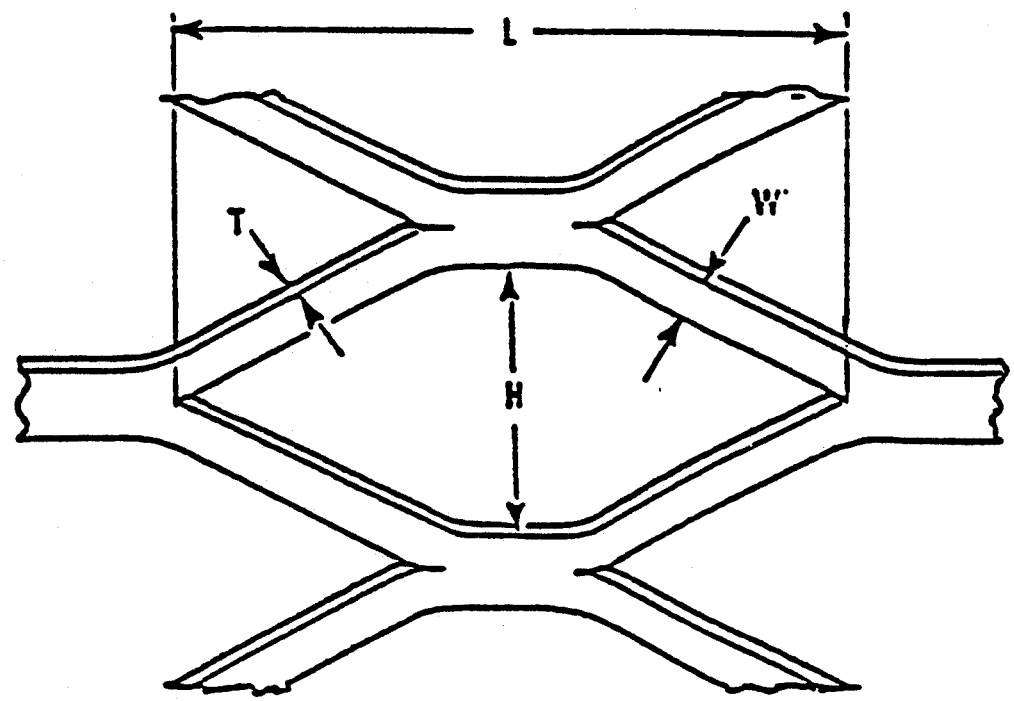
FIG. 3 shows the preferred expansion of a cathode plate, and FIGS. 4 and 5 schematically show a galvanic cell according to the present invention.

The preferred expanded metal cathode is made from a metal sheet as illustrated in FIG. 3, having a thickness T from 0.5 to 1.5 mm. The preferred distance W between the cuts in the metal plate (i.e. the "wire-thickness") is from 1 to 4 mm, with a preferred cutlength of from 5 to 30 mm. The plate is expanded with a factor of 1 to 5 to produce slots having a length L from 2 to 50 mm and a height H from 1 to 25 mm.

Figure 4:
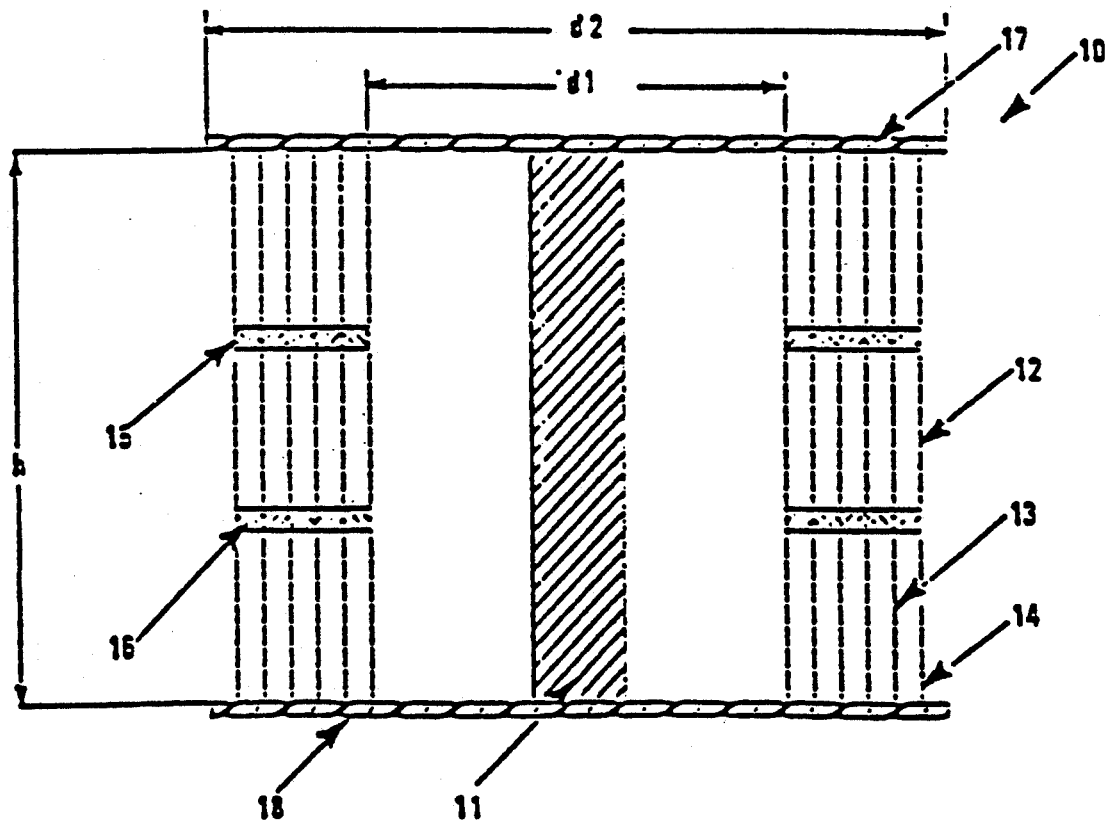

FIG. 4 illustrates schematically, and not to scale, a galvanic cell 10 having an anode 11 and a helical cathode 12 made of expanded metal sheet. The various layers 13, 14 of the expanded metal cathode are separated from each other by means of spacers 15, 16. The spacers can take many different forms. The number of layers should preferably be greater than three. The anode 11 and cathode 12 are supported between two flanges 17 and 18 of insulation material. The preferred method is to mould the flanges together with the spiral as mentioned earlier. This forms a very stiff structure which makes the use of spacers 15 and 16 unnecessary as both ends of the spiral are moulded into the flanges. Suitable polymers are polyurethanes, epoxies and polyesters and the strength of the polymer may be increased with fibers of e.g. glass reinforced plastic. Typically the anode is bolted to the flange with nylon bolts.

Assuming a current density of 200 mA/m$^2$ and a total current of 3 A, the required surface area would be 15 m$^2$. The effective area of an expanded metal plate is comprised not only of both sides of the metal plate such as the area of the strips with width W and the interconnecting strips, but also the area constituted by the thickness T of the strips. A 5 m$^2$ plate of suitable thickness having a surface area of 10 m$^2$ can for instance be cut and expanded to a plate having an exposed area of 15 m$^2$.

Given a 4.0 m times 1.0 m plate which is expanded by a factor of 2.5 to a plate having dimensions in the order of 10.0 m times 1.0 m (or somewhat less than that), an inner coil radius of 0.2 m and an increment of 0.01 m between the spiral layers, the number of layers would be about 7. The dimensions for such a spiral cathode made from a 1.0 mm thick expanded plate, would be an annulus having an inner diameter d1 of 0.4 m and an outer diameter d2 of about 0.56 m. The height h of the annulus would be somewhat less than 1.0 m. The dimensions can of course be varied, but the number of layers should preferably be greater than three.

Figure 5:
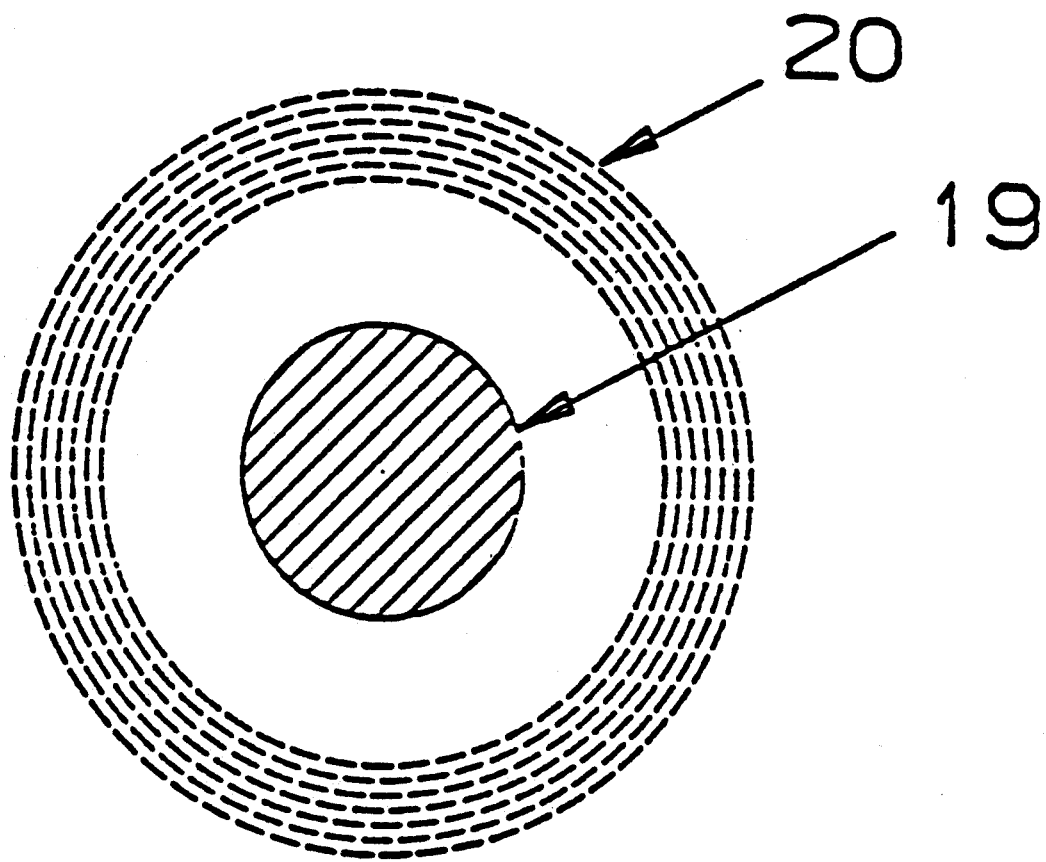

It should also be clear that one can make a cathode with the same good electrical properties from concentric cylinders of expanded metal if the cylinders are electrically interconnected. One such cell is shown schematically in FIG. 5 with an anode 19 and a cathode 20. The cell will also have the same good mechanical properties as the cell with the spiral cathode if the ends of the cathode are moulded into the flanges as mentioned above. This cell will, however, be more expensive to produce than cells with spirally coiled cathodes.

Whereas near circular expanded metal cathode layers are examplified in the drawings, changes in the shape of the spiral or cylindrical cathode layers from near circular to flat ellipsoidal form will not lead to a major change in the performance of the cell as long as the shape of the anode is changed also.

We claim:

1. Saltwater galvanic cell based on using oxygen dissolved in seawater as oxidant and comprising a coaxial arrangement of a metal anode and a separate metal cathode structure, said cathode structure comprising at least two turns of spirally wound perforated or expanded metal sheet.

2. Saltwater galvanic cell based on using oxygen dissolved in seawater as oxidant and comprising a coaxial arrangement of a metal anode and a separate metal cathode structure, said cathode structure consisting essentially of two or more concentric cylinders of perforated or expanded metal sheet.

3. Cell according to claim 2, wherein the number of concentric cylinders of the cathode is within the range of from 3 to 50.

4. Cell according to claim 2, wherein the concentric cylinders of the cathode are spaced apart with radially arranged spacing means.

5. Cell according to claim 2, wherein the cathode structure is made from plates having a thickness T from 0.5 to 1.5 mm and a distance W between cuts in the metal plate from 1 to 4 mm, with a cutlength of from 5 to 30 mm.

6. Cell according to claim 5, wherein the plate is expanded with a factor of 1 to 5 to produces slots having a length L from 2 to 50 mm and a height H from 1 to 25 mm.

7. Cell according to claim 2, further comprising two flange plates formed from insulative material for supporting respective upper and lower ends of the anode and the cathode structure.

8. Cell according to claim 6, wherein the distance between the cylinders is from 0.5 H to 5 H.

9. Cell according to claim 7 wherein the two flange plates are molded to the cathode and function as the spacing means for the cathode structure.

10. Cell according to claim 1, wherein the number of turns is within the range of from 3 to 50.

11. Cell according to claim 1, wherein the turns of the spirally wound cathode are spaced apart with radially arranged spacing means.

12. Cell according to claim 1, wherein the cathode structure is made from at least one plate having a thickness T from 0.5 to 1.5 mm and a distance W between cuts in the metal plate from 1 to 4 mm, with a cut length of from 5 to 30 mm.

13. Cell according to claim 12, wherein the plate is expanded with a factor of 1 to 5 to produces slots having a length L from 2 to 50 mm and a height H from 1 to 25 mm.

14. Cell according to claim 1, further comprising two flange plates formed from insulative material for supporting respective upper and lower ends of the anode and the cathode structure.

15. Cell according to claim 13, wherein the distance between the turns of the spiral cathode is from 0.5 H to 5 H.

16. Cell according to claim 14 wherein the two flange plates are molded to the cathode and function as a spacing means for the cathode structure.

* * * * *